A. A. CURRY.
RESILIENT TIRE FOR VEHICLE WHEELS.
APPLICATION FILED JUNE 13, 1911.
1,024,976.
Patented Apr. 30, 1912.
2 SHEETS—SHEET 1.
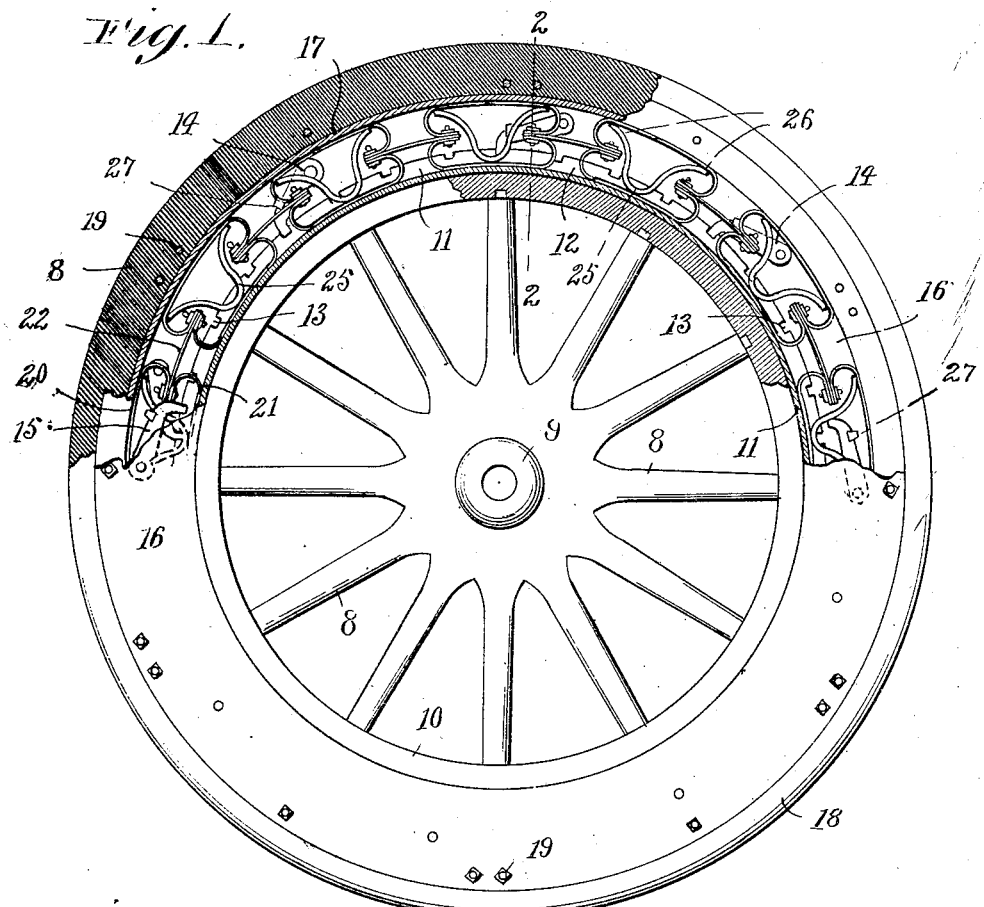
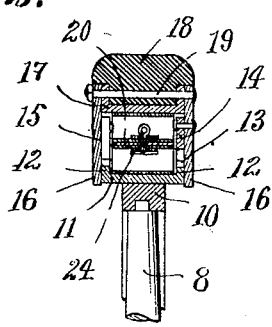
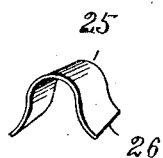
WITNESSES:
E. Earle Karlick
Ruth M. Worden
INVENTOR
Alfred A. Curry
BY
Chamberlain + Newman
ATTORNEYS

A. A. CURRY.
RESILIENT TIRE FOR VEHICLE WHEELS.
APPLICATION FILED JUNE 13, 1911.

1,024,976.

Patented Apr. 30, 1912.

2 SHEETS—SHEET 2.

WITNESSES:
E. Earle Garlick
Ruth M. Worden

INVENTOR
Alfred A. Curry

BY
Chamberlain & Newman
ATTORNEYS

UNITED STATES PATENT OFFICE.

ALFRED A. CURRY, OF BRIDGEPORT, CONNECTICUT.

RESILIENT TIRE FOR VEHICLE-WHEELS.

1,024,976.  Specification of Letters Patent.  Patented Apr. 30, 1912.

Application filed June 13, 1911. Serial No. 632,832.

*To all whom it may concern:*

Be it known that I, ALFRED A. CURRY, citizen of the United States, and resident of Bridgeport, in the county of Fairfield and State of Connecticut, have invented certain new and useful Improvements in Resilient Tires for Vehicle-Wheels, of which the following is a specification.

My invention relates to vehicle wheels, such for instance as are designed to be used on trucks, motor cars and the like, and refers particularly to a cushion or resilient tire therefor that is adapted to serve the purpose, and take the place of pneumatic tires.

The object of the invention is to provide a tire of the above class which is durable, simple and comparatively inexpensive to manufacture, and will not be susceptible to the tire troubles common to the present forms of pneumatic tires; further to so arrange and construct the device as to form a tire which will yield and thus compensate for the unevennesses in the roadway and thereby form an easy riding wheel, and finally to particularly improve upon that style and character of tire shown and described in my former United States Patent No. 996,838 dated July 4, 1911.

With these and other objects in view the invention consists in the construction and novel combination and arrangement of parts hereinafter fully described, illustrated in the accompanying drawings, and pointed out in the claims hereto appended, it being understood that various changes in the form, proportion, size and minor details of construction within the scope of the claims may be resorted to without departing from the spirit or sacrificing any of the advantages of the invention.

Figure 4:
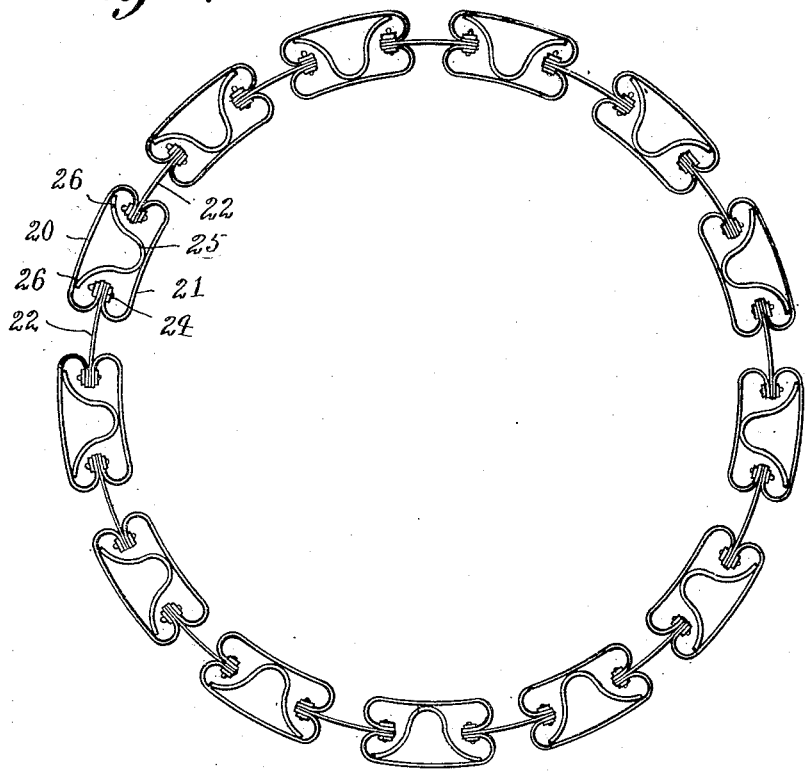
Figure 5:
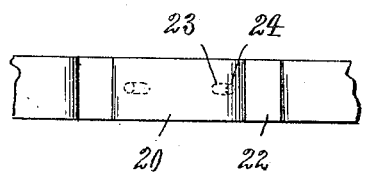
Figure 6:
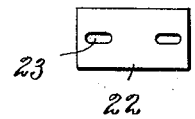

Similar characters of reference denote like or corresponding parts throughout the several figures of the accompanying drawings forming a part of this specification, and upon which, Figure 1, shows a sectional side elevation of my improved form of tire as applied to a suitable form of vehicle wheel. Fig. 2, is a transverse cross section through the tire and rim portion of the wheel, and taken on line 2—2 of Fig. 1. Fig. 3, is a detached perspective view of one of the series of U shaped springs employed within the tire. Fig. 4, is a detached side elevation of an endless sectional sheet metal chain of springs, constituting the internal yieldable structure of the tire. Fig. 5, is a detached plan view of a portion of said endless sectional spring, and, Fig. 6, is a detached plan view of one of the connecting links of said endless sectional sheet metal spring.

Referring in detail to the characters of reference marked upon the drawings 8 represents a wheel which may be of the usual construction including a hub 9 and felly 10. A rim 11 is secured to the outside of this felly in any suitable manner and is provided with an annular flange 12 upon each side, having notches 13 in their peripheries to be engaged by dogs 14 and 15 pivoted to the side plates 16 of the tire. These side plates are in the form of rings and have their inner side portions fitted and operating against the flanged sides 12 of the rim 11 before mentioned, while the outer edge portions of the said rings are secured by means of a bolt 19 to a channel rim 17 and an outer tire 18 for the purpose of rigidly securing the four parts together to form an integral tread and sides of the tire. These parts are thus normally movably connected to the rim of the wheel and are supported in their normal distended position through the medium of my novel construction of yielding device later to be referred to.

There are a series of dogs pivotally connected to each of the side plates 16 for the engagement of the notches 13 in the adjoining flanges of the rim, the series 14 of said dogs being disposed in one direction, while the other series 15 on the other side plate, are disposed in the opposite direction. thus serving to engage the tire with the upper portion of the wheel, when moving in either a forward or backward direction. These dogs drop into engagement with the notches while at the top of the wheel but naturally fall out of engagement as the wheel moves around and the dogs are carried under. This forms a positive engagement intermediate of the wheel and tire throughout a portion of the wheel, and thus leaves the rest of the wheel free to yield, come and go according to the load carried by the wheel and the condition of the road bed. A suitable bushing 27 formed of fiber or other suitable material is set into the back of each of the dogs 14 and 15 and serves to contact with the rim 17 when the dogs fall out of the notches and thus reduce the noise incident thereto.

The endless sectional sheet metal chain of springs heretofore referred to, in a measure, performs the same function and takes the place of the inner tube of a pneumatic tire, and like said tube is flexibly connected together to form an endless structure adapted to be set into or taken out of the housing of the tire, as may be required for assembling or repairs. This endless spring device is clearly shown in each of the figures of the drawing, and is represented in Fig. 4, as being detached from the tire, and ready to be placed therein. This device is formed of a series of four special shaped sheet metal spring members properly assembled and pivotally connected together in a way which will permit of the attachment and renewal of any of its parts should the same become broken or deficient. As will be noted the inner and outer bowed sheet metal members 20 and 21 of this chain, are provided with inwardly bowed and returned ends intermediate of which the connecting spring plate members 22 are pivotally and slidably connected. These plates are provided with slots 23 in each end through which the pivotal pins 24 of the bowed spring plate members pass. The construction of the several bowed and plate members connected together to form the endless spring chain are alike in construction, and in practice would be made interchangeable. Within the loop formed by the bowed spring plate members I elect to insert a U-shaped sheet metal spring 25 to stiffen and strengthen the structure and make the same less resilient. This spring plate is preferably inserted within the loop in the manner indicated which is with the rounded back portion of the plate arranged against the inside of the inner loop member 20 while the two free ends 26 of the U-shaped spring are disposed against the opposite inner side of the outer loop plate 21. The pivotal connections intermediate of these loops and plates including the pin and slot 23, is such as to allow the plates to move freely lengthwise with relation to the loops and thus permit the parts to better yield with and compensate for the pressure brought to bear, in the operation of the device. It will, of course, be observed that this connected chain of sheet metal springs can be inserted into or removed from the housing of the tire by the removal of either one of the side plates 16 which as before stated are secured in position by means of the bolts 19. It will also be apparent that my novel form of endless detachable sectional sheet metal chain of springs could be used to advantage in other forms of housings from that herein shown and described and therefore I do not wish to be limited in this particular.

Having thus described my invention what I claim and desire to secure by Letters Patent is:

1. In a resilient tire of the class described, the combination with a suitable hollow tire, of a detachable chain of resilient springs detachably placed into said tire, and comprising a series of alternately bowed and straight sheet metal pieces pivotally connected together, and separable U shaped sheet metal springs arranged in between the bowed pieces to strengthen the same.

2. In a resilient tire of the class described, the combination with a suitable hollow tire, of a detachable chain of resilient springs detachably placed into said tire and comprising a series of pairs of oppositely bowed sheet metal spring pieces with their end portions returned and disposed inwardly toward each other, and straight sheet metal spring pieces pivotally connected to such end portions of the bowed pieces.

3. In a resilient tire of the class described the combination with a suitable hollow tire, of a detachable endless chain of resilient springs adapted to be inserted into said tire and comprising a series of pairs of oppositely bowed sheet metal spring pieces, straight sheet metal springs pivotally connected intermediate of the end portions of the spring loops, and detachable U shaped sheet metal springs arranged within the loops and between the end of the straight springs.

4. In a resilient tire of the class described, the combination with a suitable hollow tire, of a detachable endless chain of resilient springs adapted to be inserted into said tire, and comprising a series of pairs of bowed sheet metal spring pieces having their ends returned and disposed parallel with each other, straight sheet metal spring pieces having their ends disposed between and pivotally connected intermediate of said pairs of returned ends to form a pivotal and flexible connection.

Signed at Bridgeport in the county of Fairfield and State of Connecticut this 12th day of June A. D., 1911.

ALFRED A. CURRY.

Witnesses:
C. M. NEWMAN,
I. L. MOREHOUSE.